(12) United States Patent
Baba

(10) Patent No.: US 8,972,591 B2
(45) Date of Patent: Mar. 3, 2015

(54) METHOD FOR DOWNLOADING SOFTWARE

(75) Inventor: Tsutomu Baba, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 333 days.

(21) Appl. No.: 13/004,301

(22) Filed: Jan. 11, 2011

(65) Prior Publication Data

US 2011/0173691 A1     Jul. 14, 2011

(30) Foreign Application Priority Data

Jan. 12, 2010    (JP) ................................. 2010-004414
Jan. 6, 2011     (JP) ................................. 2011-000946

(51) Int. Cl.
| | |
|---|---|
| G06F 15/16 | (2006.01) |
| G06F 15/173 | (2006.01) |
| G06F 17/30 | (2006.01) |
| G06F 12/14 | (2006.01) |
| H04L 29/06 | (2006.01) |
| H04L 9/32 | (2006.01) |
| G06F 21/00 | (2013.01) |
| G06F 21/44 | (2013.01) |

(52) U.S. Cl.
CPC ............ *H04L 9/3263* (2013.01); *G06F 21/445* (2013.01)
USPC ........... 709/229; 709/223; 709/227; 709/228; 709/230; 726/3; 726/4; 726/9; 726/22; 726/23; 713/156; 713/173; 713/175; 713/186; 713/187

(58) Field of Classification Search
CPC ....... H04L 9/006; H04L 9/3263; H04L 9/321; H04L 9/3273; H04L 9/0822; H04L 63/062; H04L 63/02; H04L 63/04; H04L 63/1408; H04L 63/0823; H04L 63/0869

USPC .......... 709/200, 225–229, 237, 223; 726/3, 4, 726/9, 22–23; 713/156, 170, 173, 175, 713/186–187

See application file for complete search history.

(56) References Cited

U.S. PATENT DOCUMENTS

| | | | | |
|---|---|---|---|---|
| 6,546,492 | B1 * | 4/2003 | Walker et al. ...................... | 726/3 |
| 2003/0191717 | A1 * | 10/2003 | Johnson .......................... | 705/51 |
| 2004/0199809 | A1 * | 10/2004 | Hanam et al. ..................... | 714/4 |
| 2005/0282637 | A1 * | 12/2005 | Gatto et al. ..................... | 463/42 |
| 2007/0083920 | A1 * | 4/2007 | Mizoguchi et al. ............... | 726/9 |

FOREIGN PATENT DOCUMENTS

JP     2001-195247     7/2001

* cited by examiner

*Primary Examiner* — David Lazaro
*Assistant Examiner* — Farzana Huq
(74) *Attorney, Agent, or Firm* — Frommer Lawrence & Haug LLP

(57) ABSTRACT

A method for downloading software from a host device to an electronic device through a communication line, which, even when the download is interrupted, can simplify the procedure to restart the download while maintaining security. In the method, a certificate of authenticity data, which the card reader has obtained from the HOST computer, is stored in the non volatile memory. The download of the software from the HOST computer to the card reader is executed. The verification of authenticity data is obtained by calculation with respect to the downloaded software. This verification of authenticity data is then compared with the certificate of authenticity data obtained from the HOST computer, and the downloaded software is run when the certificate of authenticity data matches the verification of authenticity data.

4 Claims, 8 Drawing Sheets

METHOD FOR DOWNLOADING SOFTWARE

The present application claims priority from Japanese Patent Application No. 2010-004414 filed on Jan. 12, 2010, and Japanese Patent Application No. 2011-000946 filed on Jan. 6, 2011 (which also claims priority to JP 2010-004414), the disclosure of which is incorporated herein by reference in its entirety.

BACKGROUND OF THE INVENTION

1. Field of the Invention

The present invention relates to a method for downloading software from a host device to an electronic device via a telecommunication line.

2. Description of Related Art

Systems in which a host device is connected to an electronic device via a telecommunication line require high security; when a host device updates the software stored in the electronic device, the electronic device needs to verify the authenticity of the software which will be downloaded.

An electronic device obtains the certificate of authenticity data (for example, hash values returned by a hash function) from a host device to certify the authenticity of the software which will be downloaded; it also obtains the verification of authenticity data by the same calculation to verify authenticity with respect to the software downloaded from the host device, and compares the certificate of authenticity data with the verification of authenticity data to verify that the downloaded software is valid; only when it is judged valid, the electronic device allows the downloaded software to run.

Further, for a system that requires higher security, a security standard has been determined; when providing a service that has a risk of illegal actions such as illegal downloads, a mutual verification process is definitely performed between the host device and the electronic device to verify that the both parties are trustworthy; then the download starts.

Unexamined Japanese Patent Application 2001-195247 ("JP 2001-195247") has disclosed that a program executing device provided in a target device (an electronic device) stores only the software, out of the software downloaded from the host device, whose security (authenticity) has been verified by a security verification means in a safe storage device, and reads the software from this safe storage device to run it.

However, if the download of software is interrupted because of a communication failure caused by a communication line problem or a power failure, there is a risk that the certificate of authenticity data obtained from the host device by the target device (electronic device) may be lost. Therefore, conventionally, in order for the target device to restart the download, the certificate of authenticity data needs to be obtained from the host device all over again. Further, in the system in which a security standard is determined and higher security is required, a mutual verification process needs to be performed again between the host device and the target device (the electronic device).

In a conventional system, if the mutual verification process is omitted at the time of restarting the download, there is a risk that even without knowledge of the mutual verification process, someone trying to steal confidential data from the system can intentionally interrupt a normal download and have the electronic device download the software which has been maliciously tampered with when the download is restarted the next time.

For this reason, a conventional system needs to perform the essential mutual verification process with respect to and obtaining the certificate of authenticity data from the host device at the time of restarting the download, requiring a longer time to restart the normal operation of the system.

In the conventional system disclosed in JP 2001-195247, additional memory is provided to temporarily store the software in order to verify safety with a safety verification means. The software is first stored in this temporary storage memory; when the safety of the software is verified, the software is stored in a safe memory device. Thus, a temporary storage memory needs to be additionally provided, increasing cost due to an increased memory size.

SUMMARY OF THE INVENTION

The present invention is devised considering the above problems, and its objective is to provide a method for downloading software from a host device to an electronic device via a communication line, in which even when the download is interrupted, the procedure to restart the download can be simplified while maintaining security.

To achieve the above objective, the present invention provides the following:

A method for downloading software in which software is downloaded from a host device via a communication line to an electronic device, comprising a first step in which prior to downloading the software, the electronic device obtains from the host device the certificate of authenticity data which certifies authenticity of the software and stores the obtained certificate of authenticity data in a non-volatile memory of the electronic device, a second step in which the download of the software from the host device to the electronic device is executed, a third step in which after the completion of the download of the software, the verification of authenticity data calculated for the downloaded software is compared with the certificate of authenticity data obtained in the first step, and a fourth step in which, when the certificate of authenticity data matches the verification of authenticity data, the electronic device runs said downloaded software.

According to the present invention, the certificate of authenticity data which the electronic device has obtained from the host device is stored in the non-volatile memory in the first step; the download of the software from the host device to the electronic device is executed in the second step; the verification of authenticity data with respect to the downloaded software is obtained by calculation and compared in the third step with the certificate of authenticity data obtained in the first step; when the certificate of authenticity data matches the verification of authenticity data, the downloaded software is run in the fourth step; therefore, even when the download of the software is interrupted due to a communication failure caused by a communication line problem or a power failure, the certificate of authenticity data which the electronic device has obtained from the host device can certainly be held in the non-volatile memory, and accordingly the process of obtaining the certificate of authenticity data from the host device can be omitted at the time of restarting the download.

Also, even if software which has been tampered with is downloaded when the download is restarted after interruption, the verification of authenticity data obtained by calculation with respect to the downloaded software does not match the certificate of authenticity data obtained from the host device and stored in the non-volatile memory; therefore, the illegal software will not be run by mistake, thus maintaining security.

In other words, even when the download is once interrupted and restarted, the verification of authenticity data obtained by calculation with respect to the downloaded software is compared with the certificate of authenticity data which has been already stored in the non-volatile memory; only when both authenticity data values match each other, the downloaded software will be run. Therefore, the process of obtaining the certificate of authenticity data from the host device can be omitted while maintaining security at the time of restarting the download, thus simplifying the procedure of restarting the download.

The method for downloading software, wherein when the download of the software is interrupted during the second step, the first step is skipped and the download is re-executed from the second step.

According to the present invention, even if the process of re-obtaining the certificate of authenticity data from the host device is skipped at the time of restarting the download after interruption, illegal software which has been tampered with won't be downloaded; therefore, security can be maintained in a system configured by a host device and an electronic device.

Therefore, the procedure to restart the download after interruption can be simplified without risking security. With this, the waiting time until the system restarts normal operation can be shortened, improving the operation efficiency of the system.

The method for downloading software, further comprising a step in which after the third step is performed, the certificate of authenticity data stored in the non-volatile memory is invalidated.

According to the present invention, the certificate of authenticity data stored in the non-volatile memory is invalidated (deleted) after the third step is performed; therefore, it can prevent the redundant download of the software or the download of the old (pre-update) version of the software by mistake.

The method for downloading software, further comprising a step in which, when the certificate of authenticity data does not match the verification of authenticity data, the downloaded software is invalidated.

According to the present invention, when the downloaded software is illegal software which has been tampered with, the certificate of authenticity data does not match the verification of authenticity data; when this is the case, the downloaded software is invalidated (deleted) to prevent the illegal software from being run by mistake.

A method for downloading software which downloads software from a host device to an electronic device via an telecommunication line, equipped with a first data storing means which stores the pre-update certificate of authenticity data certifying the authenticity of the pre-update software which has been obtained from the host device in a first data storage area of the electronic device, and a second data storing means which stores the certificate of authenticity data certifying the authenticity of the software update which will be obtained from the host device for update in a second data storage area of the electronic device; comprising a second data storing step in which before starting the download of the software update, the electronic device obtains the certificate of authenticity data from the host device and stores the obtained certificate of authenticity data in the second data storage area; a downloading step in which the download of the software update from the host device to the electronic device is executed; a data comparison step in which after the download of the software update is completed, the verification of authenticity update data obtained by calculation with respect to the downloaded software update is compared with the certificate of authenticity update data obtained in the second data storing step; a first data storing step in which, when the certificate of authenticity data matches the verification of authenticity data in the data comparison step, the certificate of authenticity data is stored as the pre-update certificate of authenticity data in the first data storage area; and a run step in which, when the certificate of authenticity data matches the verification of authenticity data in the data comparison step, the software update downloaded to the electronic device is run.

According to the present invention, the certificate of authenticity data obtained by the electronic device from the host device in the second data storing step is stored in the second data storage area of the non-volatile memory, the download of the software update to the electronic device from the host device is executed in the downloading step, the verification of authenticity data is obtained by calculation with respect to the downloaded software update, and the verification of authenticity data is compared in the data comparison step with the certificate of authenticity data obtained in the second data storing step, and the downloaded software update is run only when the verification of authenticity data matches the certificate of authenticity data. Therefore, even when the download of the software update is interrupted due to a communication failure caused by a communication line problem or a power failure, the certificate of authenticity data obtained by the electronic device from the host device can certainly be held in the second data storage area of the non-volatile memory; thus, the process of obtaining the certificate of authenticity data from the host device can be omitted at the time of restarting the download.

Also, even if the software which has been tampered with is downloaded when the download is re-executed after an interruption, the verification of authenticity data obtained by calculation for the downloaded software update does not match the certificate of authenticity data which has been obtained from the host device and stored in the second data storage area; therefore, the illegal software won't be run by mistake, thus maintaining security.

In other words, even when the download is interrupted and then restarted, the verification of authenticity data obtained by calculation with respect to the downloaded software update is compared with the certificate of authenticity data which has been stored in the second data storage area so that the downloaded software update is run only when both authenticity data values match each other; therefore, while maintaining security, the process of obtaining the certificate of authenticity data from the host device can be skipped at the time of restarting the download, simplifying the procedure to restart the download.

Further, the method for downloading software of the present invention is equipped with the first data storage area and the second data storage area in the non-volatile memory of the electronic device; when the certificate of authenticity data matches the verification of authenticity data in the data comparison step, the certificate of authenticity data is stored as the pre-update certificate of authenticity data in the first data storage area in the first data storing step so that the pre-update certificate of authenticity data that certifies authenticity of the pre-update software can be stored in the first data storage area until the process of downloading the software update is completed; therefore, even if the process of downloading the software update is interrupted due to a power failure, etc., since the pre-update certificate of authenticity data for the pre-update software is stored in the first data storage area, there won't be disagreement in comparison at the next power-on, thus preventing the electronic device from misjudging the downloaded software as illegal.

For example, even if the download process is interrupted during the process of storing the certificate of authenticity data certifying the authenticity of the software update which is the subject of download and has been received from the host device in the second data storing area of the non-volatile memory of the electronic device due to a power failure or the like and therefore the certificate of authenticity data was not written completely in the second data storing step, the pre-update certificate of authenticity data stored in the first data storage area is compared with the calculation result as the verification of authenticity data of the pre-update software when the system starts up next time. Therefore, there won't be disagreement in comparison, thus preventing the electronic device from misjudging the downloaded software as illegal and preventing the electronic device from transitioning to the emergency mode to prevent illegal use.

The method for downloading software, wherein when the download of the software update is interrupted during the downloading step, the second data storing step is skipped and the download process is restarted from the downloading step.

According to the present invention, when the download is interrupted, the process of re-obtaining the certificate of authenticity data from the host device is skipped at the time of restarting the download, but the illegal software which has been tampered with won't be downloaded; therefore, security can be maintained in the system configured by the host device and the electronic device.

Therefore, when the download is interrupted, the procedure taken to restart the download can be simplified without risking security. In this way, the waiting time until the system starts normal operation can be shortened, improving the operational efficiency of the system.

The method for downloading software, further comprising a step in which after the first data storing step is performed, the certificate of authenticity data stored in the second data storage area is invalidated.

According to the present invention, after the first data storing step is performed, the certificate of authenticity data stored in the second data storage area is invalidated (or deleted); therefore, a redundant software download or the download of old (pre-update) software by mistake can be prevented.

The method for downloading software, further comprising a step in which when the certificate of authenticity data does not match the verification of authenticity data in the data comparison step, the downloaded software update is invalidated.

According to the present invention, when the downloaded software update is illegal software that has been tampered with, the certificate of authenticity data does not match the verification of authenticity data; at that time, the downloaded software update is invalidated (or deleted) to prevent the illegal software from being run by mistake.

The method for downloading software of the present invention omits the process of re-obtaining the certificate of authenticity data from the host device when the download is interrupted and therefore restarted, but illegal software that has been tampered with will not be downloaded, thus maintaining security.

Therefore, when the download is interrupted, the procedure taken to restart the download can be simplified without risking security. In this way, the waiting time until the system restarts a normal operation can be shortened, improving the operational efficiency of the system.

Even when the download is interrupted, the downloaded software won't be misjudged as illegal as is normally the case when there is disagreement in the comparison of both data values when the system starts up next time, thus preventing the electronic device from transitioning to the emergency mode to prevent illegal use.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
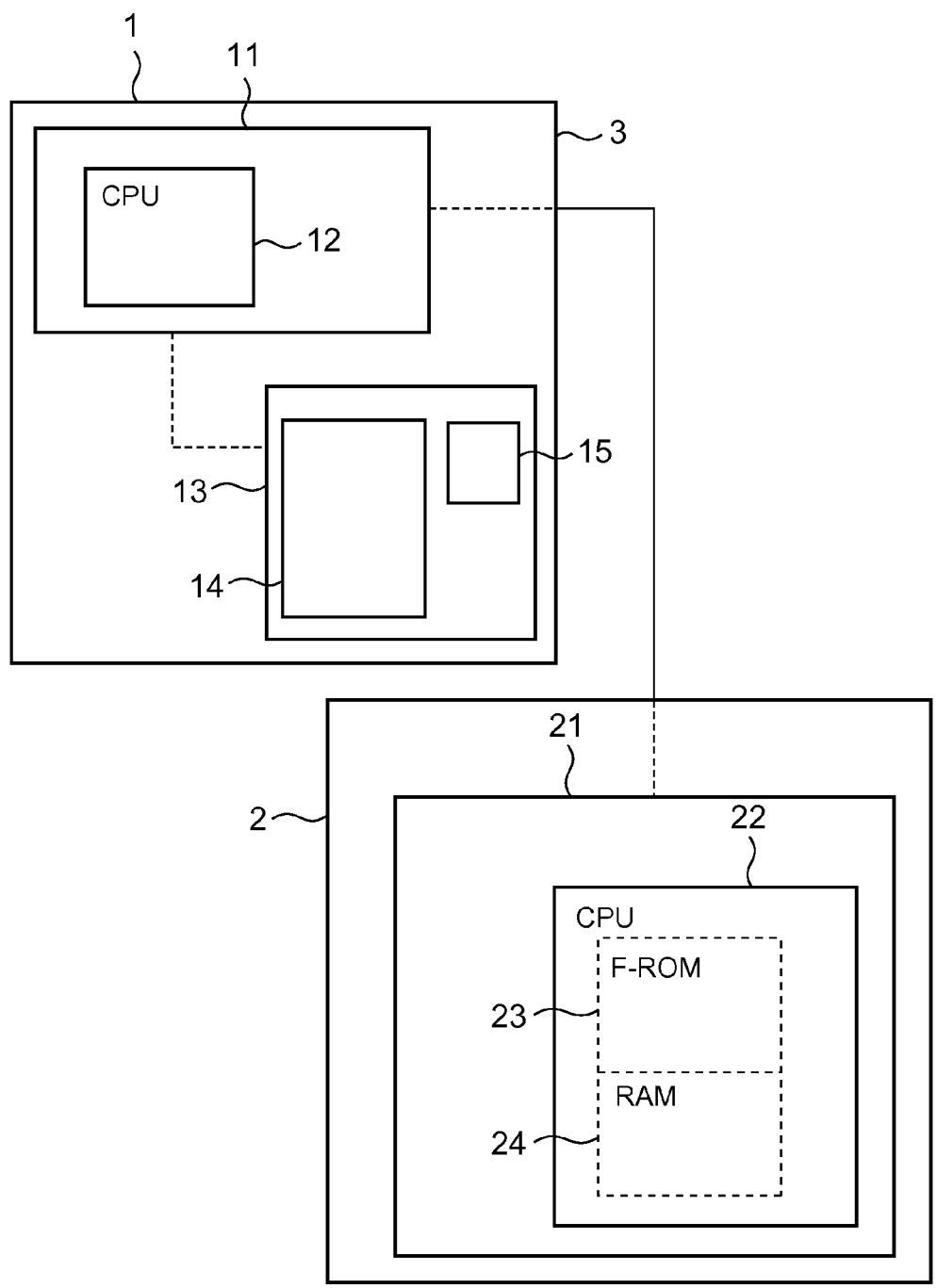
FIG. 1 shows a block diagram showing the configuration of a system used in the method for downloading software of an embodiment of the present invention.
Figure 2:
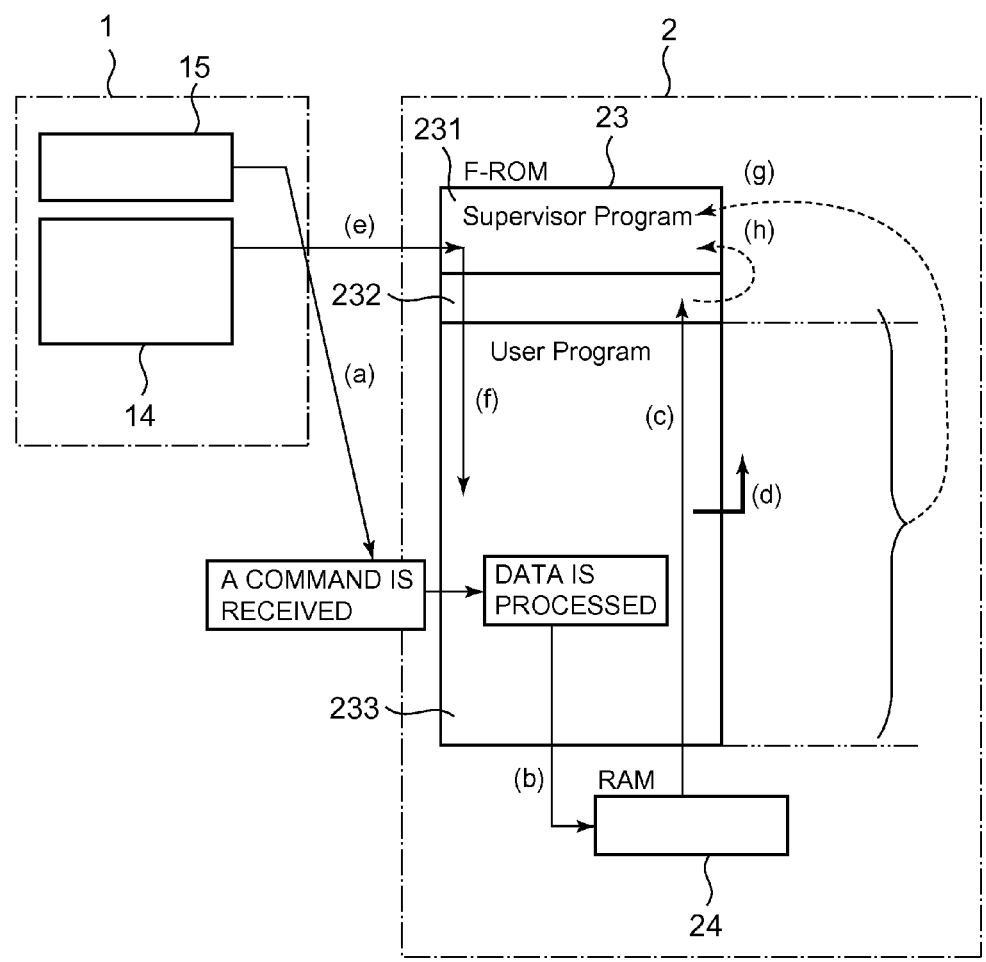
FIG. 2 shows a configuration diagram of an example of the process in the method for downloading software of the embodiment of the present invention.

Configuration of System of the First Embodiment:

FIG. 1 is a block diagram showing a configuration of a system used in a method for downloading software of an embodiment of the present invention. FIG. 2 is a configuration diagram of an example of the download status in the method for downloading software of the embodiment of the present invention. Note that the codes with letters in parentheses in FIG. 2 indicate the order of the process.

This system is configured by a host device 1 and an electronic device 2 which are connected via a communication line 3 so that an software update 14 can be downloaded from the host device to the electronic device 2 via the communication line 3. In this embodiment, the host device 1 is a HOST computer, for example, (hereinafter denoted as "HOST computer 1") and the electronic device 2 is a card reader (hereinafter denoted as "card reader 2") which reads data recorded on cards and/or records new data on the cards.

The HOST computer 1 is equipped with an operation circuit 11 which regulates the entire operation of the HOST computer 1. A CPU 12 is mounted on the operation circuit 11, and software installed in the CPU 12 administers the entire control of the HOST computer 1. Also, the HOST computer 1 is equipped with a data storage device (hard disk, for example) 13. In this embodiment, stored in the data storage device 13 are software update 14 for updating the software which has been stored in the card reader 2 and the certificate of authenticity data (hash value, for example) of the software update 14. Note that since the certificate of authenticity data 15 is generally the data to certify authenticity of the software update 14, both are supposed to be provided by the identical administrator; for example, the software update 14 and the certificate of authenticity data 15 of the software update 14 are to be distributed as a set from a vendor who provides the software to operate the card reader 2.

The card reader 2 is equipped with an operation circuit 21 which regulates the entire operation of the card reader 2. A CPU 22 is mounted on this operation circuit 21, and the software installed in the CPU 22 administers the entire control of the card reader 2.

A non-volatile memory 23 such as an F-ROM (Flash Read Only Memory) and a RAM (Random Access Memory) 24 are built into the CPU 22.

The non-volatile memory 23 stores a control program which regulates the card reader 2 and the data such as the initial value. More specifically described, as shown in FIG. 2, the non-volatile memory 23 has a supervisor program area 231, a data saving area 232 and a user program area 233. In the supervisor program area 231, software to execute the download is stored. Further, in this embodiment, the certificate of authenticity data 15 is compared with the verification of authenticity data. The data saving area 22 saves the data necessary to operate the card reader, and also stores the certificate of authenticity data 15 sent from the HOST computer 1 in this embodiment. In the user program area 233, software to operate the card reader 2 is normally stored, and also the software update is stored through the download.

The RAM 24 stores various operation data and functions as a work area. Note that the non-volatile memory 23 and the RAM 24 are not limited to those built into the CPU 22, but may also be an external F-ROM or an external RAM which is externally connected. Also, for the non-volatile memory 23 can be used not only the F-ROM but also various ROMs which can hold memory with no power supply or a RAM with a battery backup which can hold data even when the power is off.

The communication line 3 includes both wired and wireless network; an RS 232C or a USB may be used for the wired network. In this embodiment, the card reader 2 receives commands from the HOST computer 1 through the communication line 3, executes processes requested by the commands, and returns the processing results to the HOST computer 1.

Next described is a procedure to download an software update, referring to FIG. 2. In FIG. 2, the card reader 2 receives from the HOST computer 1 the certificate of authenticity data 15 certifying the authenticity of software update which will be downloaded together with a command before starting the download of the software update 14 and performs a data processing using the program stored in the user program area 233 to convert the data into the form that can be processed in the card reader (code (a)). The obtained certificate of authenticity data 15 is held in the RAM 24 (code (b)). The card reader 2 stores the certificate of authenticity data 15, which was held in the RAM 24, in the data saving area 232 of the non-volatile memory in the card reader 2 (code (c)). The certificate of authenticity data 15 stored in the non-volatile memory 23 won't be lost even when the power of the card reader 2 is turned OFF.

Next, upon receiving a command from the HOST computer 1, the card reader 2 transitions to a download executing mode. In other words, a supervisor program stored in the non-volatile memory 23 is run (code (d)). The supervisor program receives from the HOST computer 1 a command to download (code (e)). The download of the software update 14 is executed and the software update 14 is stored in the user program area 233 of the non-volatile memory 23 (code (f)).

After the download of the software update 14 is completed, the supervisor program of the card reader 2 obtains by a predetermined calculation the verification of authenticity data with respect to the software update 14 downloaded to the user program area 233 (code (g)). Further, the card reader 2 uses the supervisor program to compare the verification of authenticity data obtained by the calculation with the certificate of authenticity data 15 which has been stored in the non-volatile memory 23 in advance; when the certificate of authenticity data 15 matches the verification of authenticity data, the downloaded software update is run (code (h)).

As described above, this system holds the certificate of authenticity data 15, which the card reader 2 has obtained from the HOST computer 1 in advance, in the data saving area 232 of the non-volatile memory 23. Therefore, even when the download is interrupted due to a power failure or even when the power is turned OFF after the download is interrupted, the certificate of authenticity data 15 is kept in the card reader 2 because the non-volatile memory 23 is used to store the certificate of authenticity data 15.

Therefore, when restarting the download after the interruption, the card reader 2 re-executes the download of the software update 14 from the beginning but without re-obtaining the certificate of authenticity data 15 from the HOST computer 1.

After the download is completed, the card reader 2 uses the supervisor program to obtain by calculation the verification of authenticity data with respect to the downloaded software update 14 and compares it with the certificate of authenticity data 15 which has been stored in advance. In other words, the only software that can be used by the card reader 2 for update at this time is the software update 14 for which the download was interrupted.

If the card reader 2 attempts to update the pre-update software with software other than the download-interrupted software, the certificate of authenticity data 15 will not match the verification of authenticity data at the comparison performed after the completion of the download; thus, the card reader 2 understands that the calculation result of the verification of authenticity data for invalid software is compared with the certificate of authenticity data 15 stored in advance, and does not run the downloaded software.

By holding the certificate of authenticity data in the non-volatile memory 23, the card reader 2 can omit the process of re-obtaining the certificate of authenticity data 15 from the HOST computer, and further the illegal software which has been tampered with is prevented from being used for update even though the process of mutual verification is not performed again.

Next described is a procedure when the card reader 2 receives a command from the HOST computer 1 to download the software update 14 (including the above-described codes (a) through (h)).

Figure 3:
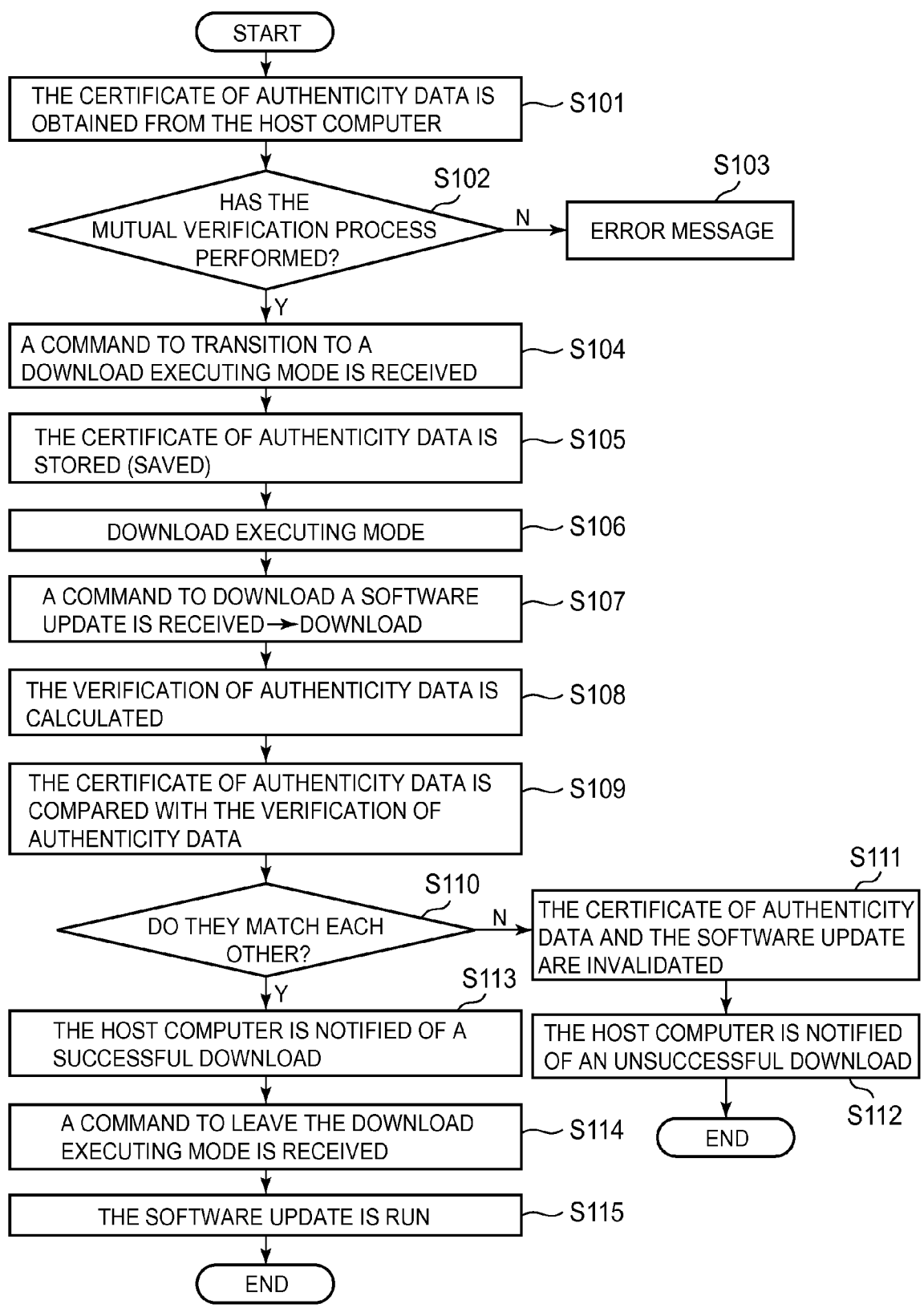
FIG. 3 shows a flowchart of an example of the process in the method for downloading software which is normally performed with the configuration of FIG. 2.

Successfully Performed Download Process:

FIG. 3 is a flowchart of an example of a successfully executed download in the method for downloading software of the embodiment of the present invention.

Process (1) The card reader 2 obtains the certificate of authenticity data 15 of the software update 14 from the HOST computer 1 through a command (S101).

Process (2) In other words, upon receiving the command of S101, the HOST computer 1 checks if the verification process has been completed successfully (S102). When the mutual verification process has been successfully completed, the card reader accepts the command of S101 and proceeds to S104. On the other hand, when the verification process has not been successfully completed, an error message is returned to the HOST computer 1 (S103). Note that "mutual verification" means that the HOST computer 1 verifies if the card reader 2, its communication subject, is valid and the card reader 2 verifies if the HOST computer 1 is valid.

Process (3) The HOST computer 1 sends to the card reader 2 a command to transition to the download executing mode (S104).

Process (4) Upon receiving the command, the card reader 2 writes the certificate of authenticity data obtained in the Process (1) to the data saving area 232 of the non-volatile memory 23 (S105) and then transitions to the download executing mode (S106).

Process (5) The HOST computer 1 sends the card reader 2 a command to execute the download of the software update (S107). In other words, the process demanded by the command is executed; more specifically, the software update 14 is downloaded and stored in the F-ROM 22 of the card reader 2.

Process (6) Upon completion of downloading all the data of the software update 14, the card reader 2 uses the supervisor program to obtain the verification of authenticity data for the downloaded software update 14 by calculation (S108).

Process (7) The card reader 2 uses the supervisor program to compare the certificate of authenticity data 15 stored in the non-volatile memory 23 with the verification of authenticity data obtained by calculation (S109).

Process (7-1) When the certificate of authenticity data 15 matches the verification of authenticity data, the card reader 2 judges that the downloaded software update 14 is valid and notifies the HOST computer 1 that the download has been completed successfully, which means the software is updated.

Process (8-1) Upon receiving the notice of a successfully-completed download, the HOST computer 1 sends to the card reader 2 a command to leave the download executing mode (S114). Upon receiving the command to leave the mode, the card reader 2 invalidates the certificate of authenticity data 15 stored in the non-volatile memory 23, runs the downloaded software update 14 and finishes the process (S115).

Process (7-2) On the other hand, when as the result of the comparison in Process (7), the certificate of authenticity data 15 does not match the verification of authenticity data, the card reader 2 regards the downloaded software as invalid, invalidates the certificate of authenticity data 15 stored in the non-volatile memory 23 and the downloaded software, and notifies the HOST computer of an unsuccessful download; that is, the software is not updated (S111, S112).

Process (8-2) When the download is not successful (S112), the card reader 2 does not run the downloaded software even though receiving the command to leave the download executing mode.

Note that the downloaded software update 14 and the certificate of authenticity data 15 can be paired as a set in a single download file.

Figure 4:
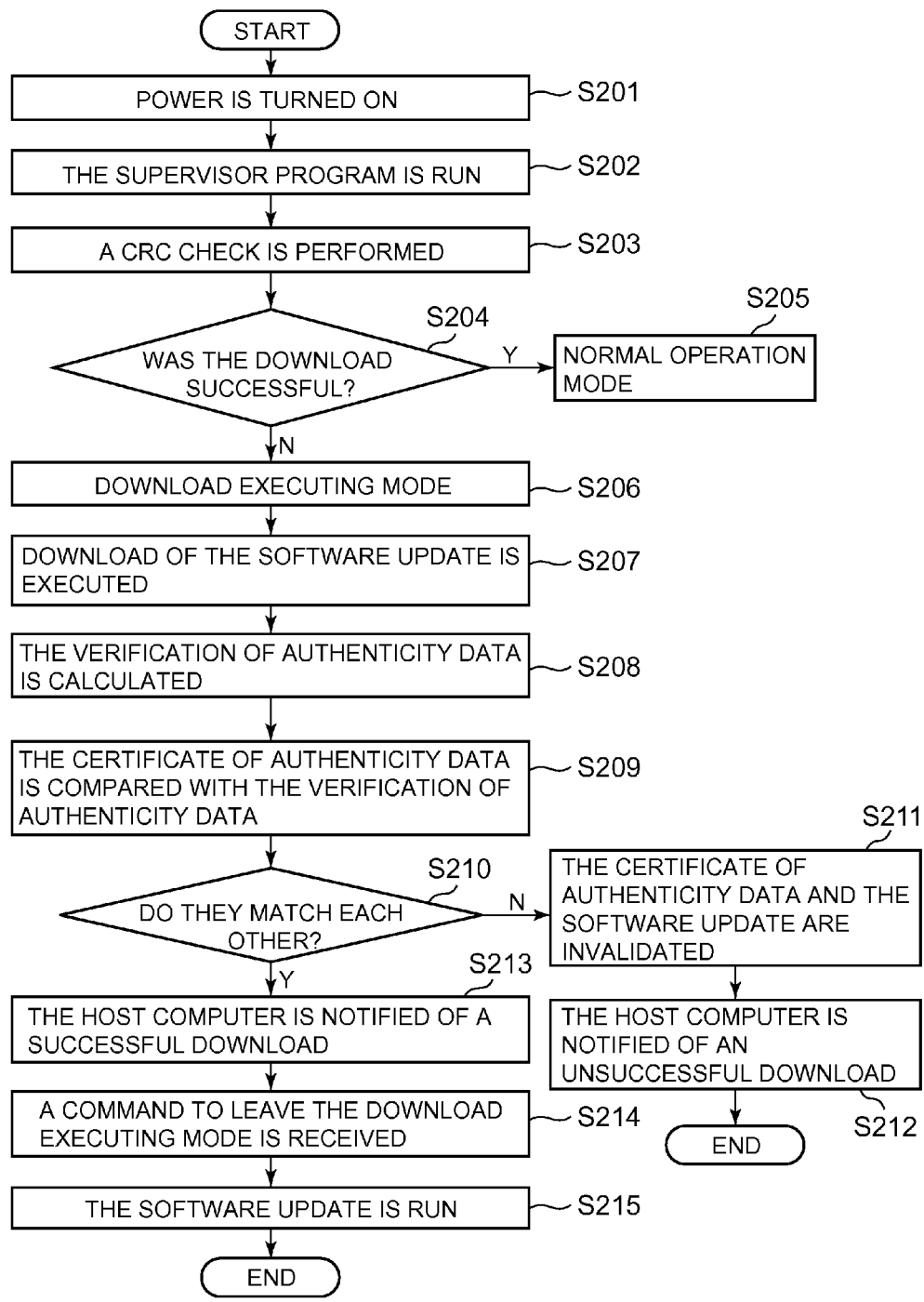
FIG. 4 shows a flowchart of an example of the process in the method for downloading software which is performed when there is an interruption in the configuration of FIG. 2.

Post-Process after Download Interruption:

FIG. 4 is a flowchart of an example of a process after the download is interrupted, in the method for downloading software of the embodiment of the present invention.

When the download was interrupted due to a communication failure during the time of executing the process from S107 described in the above Process (5) to S115 described in Process (8-1), the download is re-executed from Process of (5).

When the card reader 2 judges at the time of power-on that the download of the software to be run has been interrupted in the middle of a series of processes of the download, it enters the download executing mode to wait for the start of the download. In other words, the card reader skips the above Processes (1) through (4) and returns to the time immediately before Process of (5).

More specifically described, as the power is turned on again after the download interruption (S201), the card reader 2 runs the supervisor program (S202) to perform a CRC check on the program stored in the user program area 233 (S203).

When judging according to the CRC check that the download of the software update 14 has been completed successfully, the card reader 2 transitions to a normal operation mode (S204, S205).

On the other hand, when judging according to the CRC check that the download of the software update 14 was interrupted, the card reader 2 enters the download executing mode in which it waits for the start of the download (S206). After that, the card reader 2 re-executes the download from the process step S207 in order. Note that the process steps from S207 to S212 in FIG. 4 is the same as those from S107 to S112 in FIG. 3; therefore, their description is omitted here.

Major Effects of the Embodiment:

If the card reader 2 downloads software different from one at the previous download when re-executing the download as described above, the card reader 2 first performs the above-described Processes (5) and (6) and then enters the above-described Processes (7-2) and (8-2). Therefore, even when the card reader 2 skips the above-described Processes (1) through (4), it will not run illegal software, thus maintaining security. Further, although in this embodiment, the re-performing of the mutual verification process between the HOST computer 1 and the card reader 2 to ensure each other's validity is skipped, the illegal software will not be run, thus maintaining security.

Also, there is no need to provide an additional memory to the card reader 2 to temporarily store the software unlike a system using conventional technology, and the existing means can handle the process; therefore, while maintaining security at the same level as a system using conventional technology, the increase of cost due to the increased memory capacity can be prevented.

Other Embodiment:

When the card reader 2 judges that illegal software has been downloaded, it may invalidate (or delete) the software to freeze the downloaded software; however, even if the card reader transitions to the mode allowing download and executes the download many times, any software other than the download-interrupted software fails update, thus maintaining security.

When judging that illegal software has been downloaded, the card reader 2 regards the status as a security error and notifies all the commands of security error; however, it may return no error message but just freeze the software without responding.

This system is configured to write to the F-ROM directly at the download; however, as in conventional technology, it may be configured such that the software update 14 is temporarily held in the RAM to check authenticity and written to the F-ROM when the software is judged valid.

Figure 5:
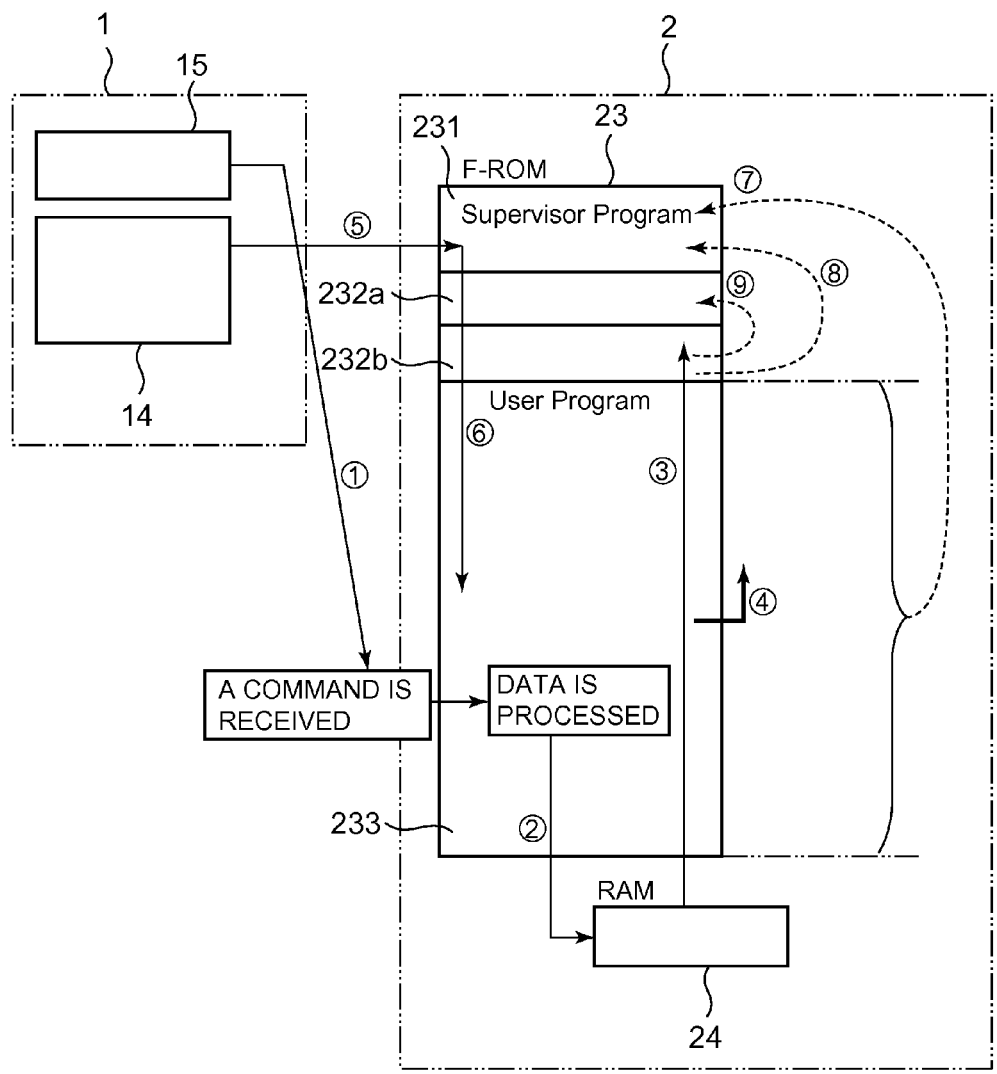
FIG. 5 shows a configuration diagram of another example of the process in the method for downloading software of the embodiment of the present invention.

Configuration of System of Second Embodiment:

FIG. 5 is a configuration diagram of another example of the download in the method for downloading software of the embodiment of the present invention. Note that the codes denoted by circled numbers in FIG. 5 indicate the order of the process. Also, the same codes are given to those that have the same configuration shown in FIG. 2.

The block diagram of the configuration of the system of the second embodiment is the same as the block diagram (FIG. 1) used in the above-described first embodiment; therefore, their description is omitted.

In the second embodiment as shown in FIG. 5, the non-volatile memory 23 stores a control program which regulates the card reader 2 and the data such as the initial value. More specifically described, the non-volatile memory 23 has a supervisor program area 231, a first data storage area 232a and a second data storage area 232b as data saving areas and a user program area 233. The data saving area saves the data necessary to operate the card reader, and is divided into the first data storage area 232a and the second data storage area 232b. The first data storage area 232a stores the pre-update certificate of authenticity data certifying the authenticity of the pre-update software which has been obtained from the HOST computer 1, and the second data storage area 232b stores the certificate of authenticity data certifying the authenticity of the software update which will be obtained for update. Software to operate the card reader 2 is normally stored in the user program area 233 in which the software update is stored through downloading.

Note that the data saving areas won't limit divided area into two parts such as the first data storage area 232a and the second data storage area 232b.

The card reader 2 is equipped with a first data storing means which stores in the first data storage area 232a the pre-update certificate of authenticity data certifying the authenticity of the pre-update software which has been obtained from the HOST computer 1, and a second data storing means which stores in the second data storage area 232b the certificate of authenticity data certifying the authenticity of the software update which will be obtained from the HOST computer 1 for update. Note that the F-ROM can be the non-volatile memory to which the certificate of authenticity data 15 and the pre-update certificate of authenticity data is written, but the RAM with battery backup may also be used. Note that, when the first data storage area 232a and the second data storage area 232b are provided in the F-ROM, they are allocated in different erase blocks.

Next described is a procedure for downloading software update 14 which is obtained from the HOST computer 1 for update, referring to FIG. 5. In FIG. 5, before starting to download the software update 14, the card reader 2 receives together with a command from the HOST computer 1 the certificate of authenticity data 15 certifying the authenticity of software update which will be downloaded and performs a data processing using the program stored in the user program area 233 to convert the data into the form that can be processed in the card reader (code ①). The obtained certificate of authenticity data 15 is held in the RAM 24 (code ②). The card reader 2 stores the certificate of authenticity data 15 held in the RAM 24 in the second data storage area 232b of the non-volatile memory 23 in the card reader 2 (code ③). The certificate of authenticity data 15 stored in the non-volatile memory 23 won't be lost even when the power of the card reader 2 is turned OFF.

Next, the card reader 2 receives a command from the HOST computer 1 to transition to a download executing mode. In other words, a supervisor program stored in the non-volatile memory 23 is run (code ④). The supervisor program receives a download command from the HOST computer 1 (code ⑤). The download of the software update 14 is executed and the software update 14 is stored in the user program area 233 of the non-volatile memory 23 (code ⑥).

After the download of the software update 14 is completed, the supervisor program of the card reader 2 obtains by a predetermined calculation the verification of authenticity data with respect to the software update 14 downloaded in the user program area 233 (code ⑦). Further, the card reader 2 uses the supervisor program to compare the verification of authenticity data obtained by calculation with the certificate of authenticity data 15 which is stored in the second data storage area 232b of the non-volatile memory 23 in advance; when the certificate of authenticity data 15 matches the verification of authenticity data, the downloaded software update 14 is run (code ⑧).

When the certificate of authenticity data 15 matches the verification of authenticity data obtained by calculation, the supervisor program of the card reader 2 stores the certificate of authenticity data 15, which is stored in the after-update data storage area 232b, as the pre-update certificate of authenticity data in the first data storage area 232a (code ⑨).

As described above, in this system of the second embodiment, the card reader 2 is equipped with the first data storage area 232a and the second data storage area 232b in the non-volatile memory 23; when, in the data comparing step of code ⑧, the certificate of authenticity data 15 matches the verification of authenticity data obtained by calculation, the certificate of authenticity data 15 stored in the second data storage area 232b is stored as the pre-update certificate of authenticity data in the first data storage area 232a. In this system, the card reader 2 receives from the HOST computer 1 the certificate of authenticity data 15 certifying the authenticity of the software update 14 which is the subject of download and then stores this data in the second data storage area 232b of the non-volatile memory of the card reader 2; even when the process of storing the data is interrupted due to a power failure or the like and therefore the certificate of authenticity data 15 has not been written completely, the pre-update certificate of authenticity data stored in the first data storage area 232a is compared with the calculation result of the verification of authenticity data for the pre-update software which is to be updated, and the comparison results in agreement. In other words, this system won't misjudge the download as illegal because of the comparison disagreement and transition by mistake to the emergency halt mode to prevent illegal use.

Also, even when the process is interrupted due to a power outage or the like before the download of the software update 14 at code ⑥ is executed, since this system has kept the pre-update certificate of authenticity data for the software which is to be updated in the first data storage area 232a, this system can compare the pre-update certificate of authenticity data stored in the first data storage area 232a with the calculation result of the verification of authenticity data of the software which is to be updated when the power is back on, and the comparison results in agreement. Therefore, the system won't transition to the emergency halt mode by mistake.

Also, in this system, when the process is interrupted in the midst of the first data storing step of the code ⑨ due to a power outage or the like, the data stored in the first data storage area 232a is damaged, but the certificate of authenticity data 15 with respect to the software update 14 is stored in the second data storage area 232b. Therefore, in this system, the certificate of authenticity data 15 stored in the second data storage area 232b is compared with the calculation result of the verification of authenticity data obtained by calculation with respect to the software update 14 when the power comes back on; since the comparison results in agreement, this system won't transition to the emergency halt mode by mistake.

In the same manner as the system of the first embodiment, this system of the second embodiment can simplify the procedure to restart the download while maintaining security even when the download process is interrupted.

Described next is the procedure in which the card reader 2 receives a command from the HOST computer 1 to download the software update 14 (including the above-described codes ① through ⑨).

Figure 6:
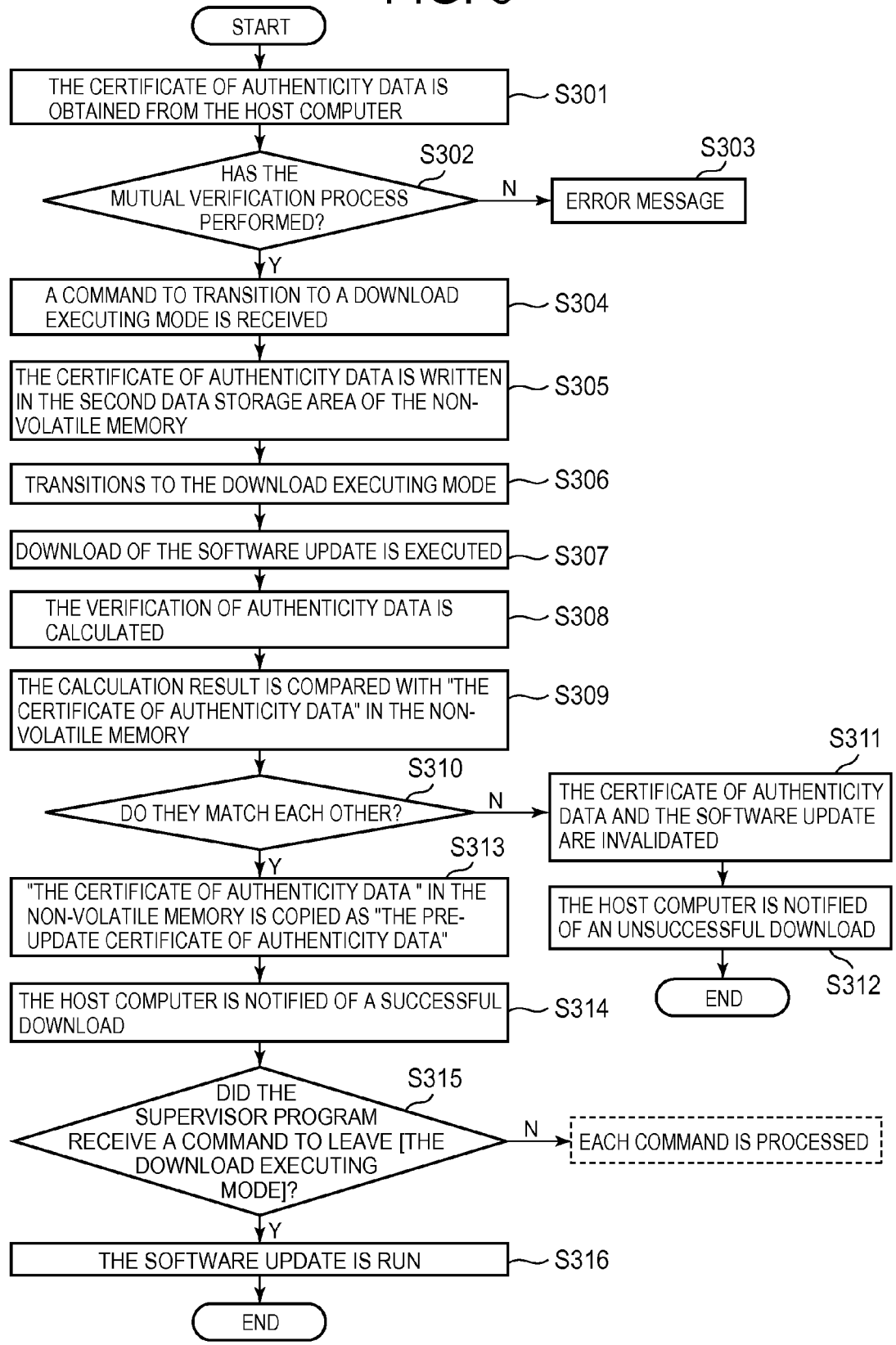
FIG. 6 shows a flowchart of an example of the process in the method for downloading software which is normally performed with the configuration of FIG. 5.

Successfully Performed Download Process:

FIG. 6 is a flowchart of an example of a successfully-performed download in the method for downloading software of the second embodiment.

Process (I) The card reader 2 receives the certificate of authenticity data 15 for the software update 14 from the HOST computer 1 through a command (S301).

Process (II) Upon receiving the command of S301, the system checks if the mutual verification process has been successfully completed (S302). When the mutual verification process has been successfully completed, the card reader 2 accepts the command of S301 and the proceeds to S304. On the other hand, when the mutual verification process has not been successfully completed, an error message is returned to the HOST computer (S303). Note that "mutual verification" means that the HOST computer 1 verifies if the card reader 2, its communication subject, is valid and the card reader 2 verifies if the HOST computer 1 is valid.

Process (III) The HOST computer 1 sends to the card reader 2 a command to transition to the download executing mode (S304).

Process (IV) Upon receiving the command, the card reader 2 writes the certificate of authenticity data obtained in Process (1) to the second data storage area 232b of the non-volatile memory 23 (S305) and then transitions to the download executing mode (S306).

Process (V) The HOST computer 1 sends to the card reader 2 a command to execute the download of the software update 14 (S307).

Process (VI) In other words, the process requested by the command is performed; more specifically, the card reader 2 downloads the software update 14 and stores it in the F-ROM 22 thereof.

Process (VII) At the point of completion of downloading the entire data of the software update 14, the card reader 2 obtains the verification of authenticity data with respect to the downloaded software update 14 by calculation using the supervisor program (S308).

Process (VIII) Using the supervisor program, the card reader 2 compares the certificate of authenticity data 15 stored in the second data storage area 232b of the non-volatile memory 23 with the verification of authenticity data obtained by calculation (S309).

Process (IX) When the certificate of authenticity data 15 matches the verification of authenticity data obtained by calculation, the card reader 2 judges that the downloaded software update 14 is valid (S310), copies the certificate of authenticity data 15 stored in the second data storage area 232b into the first data storage area 232a (S313), and notifies the HOST computer 1 that the download has been completed successfully; that is, the software is updated (S314). Note that the card reader 2, after copying, may erase the certificate of authenticity data 15 stored in the second data storage area 232b.

Upon receiving the notice of a successfully-completed download, the HOST computer 1 sends to the card reader 2 a command to leave the download executing mode (S315). Upon receiving the command to leave the mode, the card reader 2 runs the downloaded software update 14 and finishes the process (S316).

On the other hand, when the certificate of authenticity data 15 does not match the verification of authenticity data obtained by calculation, the card reader 2 regards the downloaded software as invalid (S310), invalidates the certificate of authenticity data 15 stored in the second data storage area 232b of the non-volatile memory 23 and the downloaded software, and notifies the HOST computer 1 that the download did not complete successfully, that is the software could not be updated (S311, S312).

When the download did not complete successfully (S312), the card reader 2 does not run the downloaded software even though receiving the command to leave the download executing mode after the process finished. Also, the card reader 2 notifies all the commands of a security error and finishes the process.

Figure 7:
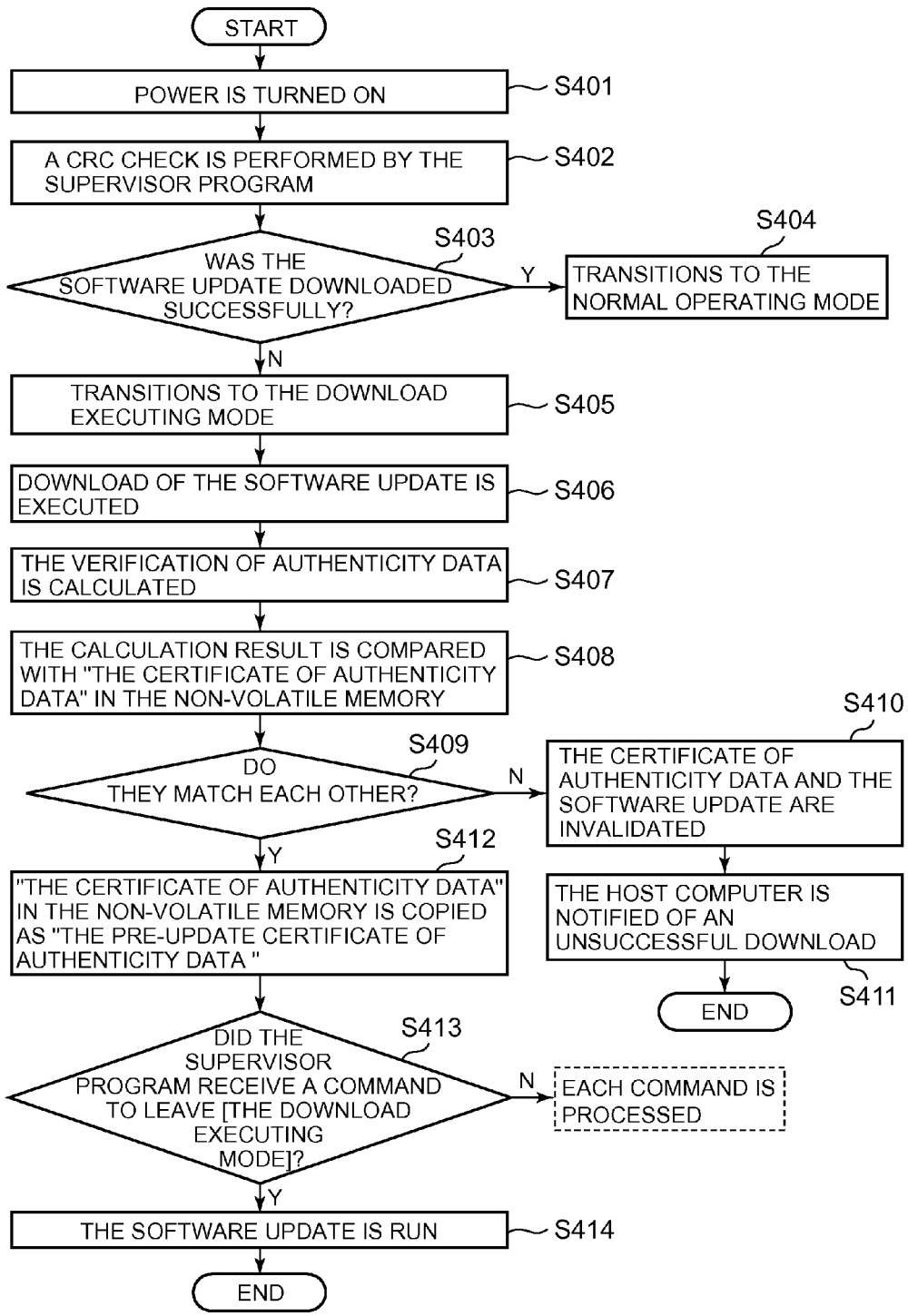
FIG. 7 shows a flowchart of an example of the process in the method for downloading software which is performed when there is an interruption in the configuration of FIG. 5.

Process after Download is Interrupted:

FIG. 7 is, in the method for downloading software of the second embodiment, a flowchart of an example of the process of the method for downloading software which is implemented when the download is interrupted.

When power is back on after the process of downloading the software update 14 was interrupted (S401), the card reader 2 runs the supervisor program to perform a CRC check on the program stored in the user program area 233.

When judging according to the CRC check that the download of the software update 14 has been completed successfully, the card reader 2 transitions to the normal operation mode (S403, S404).

On the other hand, when judging according to the CRC check that the download of the software update 14 was interrupted, the card reader 2 transitions to the download executing mode and downloads the software update 14 (S405, S406).

Upon completion of downloading all the data of the software update 14, the card reader 2 obtains the verification of authenticity data with respect to the downloaded software update 14 by calculation using the supervisor program (S408).

Using the supervisor program, the card reader 2 compares the certificate of authenticity data 15 stored in the second data storage area 232b of the non-volatile memory 23 with the verification of authenticity data which is obtained by calculation (S408).

When the certificate of authenticity data 15 matches the verification of authenticity data obtained by calculation, the card reader 2 judges that the downloaded software update 14 is valid (S409), copies the certificate of authenticity data 15 stored in the second data storage area 232b into the first data storage area 232a (S412), and notifies the HOST computer 1 that the download has been completed successfully.

Upon receiving the notice of a successfully-completed download, the HOST computer 1 sends to the card reader 2 a command to leave the download executing mode (S413). Upon receiving the command to leave the mode, the card reader 2 runs the downloaded software update 14 and finishes the process (S414).

On the other hand, when the certificate of authenticity data 15 does not match the verification of authenticity data, the card reader 2 regards the downloaded software as invalid (S409), invalidates the certificate of authenticity data 15 stored in the second data storage area 232b of the non-volatile memory 23 and the downloaded software, and notifies the HOST computer 1 that the download has not been completed successfully (S410, S411).

When the download is not successful (S411), the card reader 2 does not run the downloaded software even though receiving the command to leave the download executing mode after the process finished. Also, the card reader 2 notifies all the commands of a security error and finishes the process.

Figure 8:
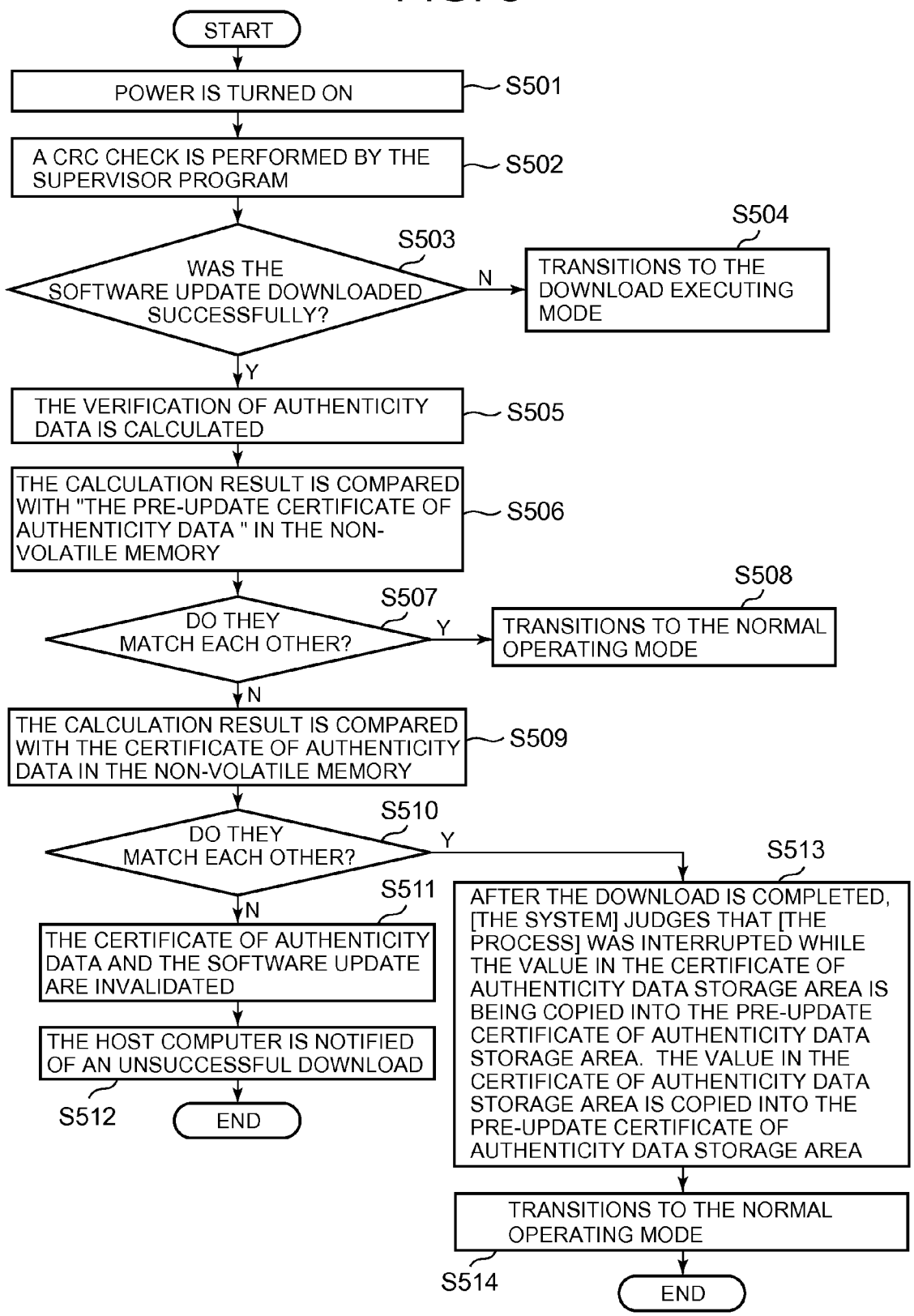
FIG. 8 shows a flowchart of an example of a process in the method for verifying authenticity of the software which is run at the power-on in the configuration of FIG. 5.

Process of Verifying Authenticity at Power-on:

FIG. 8 is, in the method for downloading software of the second embodiment, a flowchart of an example of the process of the method for verifying the authenticity of software which is performed when the power is back on.

When the power is back on (S501), the card reader 2 runs the supervisor program to perform a CRC check on the program stored in the user program area 233 (S502).

When judging according to the CRC check that the download of the software update 14 did not complete successfully, the card reader 2 transitions to the download executing mode (S503, S504).

On the other hand, when judging according to the CRC check that the download of the software update 14 has been completed successfully, the card reader 2 obtains the verification of authenticity data with respect to the downloaded software by calculation using the supervisor program (S503, S505).

Using the supervisor program, the card reader 2 compares the pre-update certificate of authenticity data stored in the first data storage area 232a of the non-volatile memory 23 with the verification of authenticity data which is obtained by calculation (S506).

When the pre-update certificate of authenticity data matches the verification of authenticity data obtained by calculation, the card reader 2 judges that the downloaded software is valid (S507) and transitions to the normal operation mode (S508).

On the other hand, when the pre-update certificate of authenticity data does not match the verification of authenticity data obtained by calculation, the card reader 2 compares the certificate of authenticity data stored in the second data storage area 232b with the verification of authenticity data obtained by calculation (S509).

When the certificate of authenticity data stored in the second data storage area 232b matches the verification of authenticity data obtained by calculation, the card reader 2 judges that the process was interrupted in the midst of the process of copying the certificate of authenticity data stored in the second data storage area 232b into the first data storage area 232b after the completion of downloading the software update 14 (S510), then copies the certificate of authenticity data stored in the second data storage area 232b as the pre-update certificate of authenticity data in the first data storage area 232a (S513) and transitions to the normal operation mode (S514).

On the other hand, when the certificate of authenticity data does not match the verification of authenticity data obtained by calculation, the card reader 2 regards the downloaded software as invalid (S510), invalidates the certificate of authenticity data 15 stored in the second data storage area 232b of the non-volatile memory 23 and the downloaded software, and notifies the HOST computer 1 that the download did not complete successfully (S511, S512).

When judging that the downloaded software is abnormal (S512), the card reader 2 does not run the downloaded software even though receiving the command to leave the download executing mode after the process is finished. Also, the card reader 2 notifies all the commands of security error and finishes the process.

Major Effect of this Embodiment:

Configured as described above, this system of the second embodiment can be recovered with certainty even when a series of download processes is interrupted; therefore, reliability of the system can be improved.

Also, even when the process of downloading software is interrupted due to a power outage or the like, since this system stores the certificate of authenticity data for the respective software in the first data storage area and the second data storage area respectively, this system can prevent the comparison at the power-on from being mismatched and the download from being misjudged as illegal.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 Host device
2 Electronic device
3 Communication line
9 CPU
10 Memory
12 CPU
13 Data storage device
14 Software (Software update)
15 The certificate of authenticity data
21 Operation circuit
22 CPU
23 Non-volatile memory
24 RAM

What is claimed is:

1. A method for downloading software from a host device to an electronic device via a telecommunication line, the method comprising:
a step of providing an electronic device which comprises:
a first data storing means which stores a pre-update certificate of authenticity data in a first data storage area of said electronic device, the pre-update certificate of authenticity data certifying authenticity of pre-update software already loaded in the electronic device; and
a second data storing means configured to store a second certificate of authenticity data in a second data storage area of said electronic device, the second certificate of authenticity data certifying authenticity of a second software to be newly loaded in the electronic device which will be obtained from said host device for updating the electronic device;
a storing step in said second data storage area, in which, before starting a download of said second software to be newly loaded, said electronic device obtains said second certificate of authenticity data from said host device and stores said obtained second certificate of authenticity data in said second data storage area;

a downloading step in which the download of said second software from said host device to said electronic device is executed;

a data comparison step in which, after the download of said second software is completed, a verification of authenticity data, obtained by calculation with respect to said downloaded second software, is compared with said second certificate of authenticity data obtained in said storing step;

a data storing step in said first data storage area, in which, when said second certificate of authenticity data matches said verification of authenticity data in said data comparison step, said second certificate of authenticity data is stored as the pre-update certificate of authenticity data in said first data storage area; and a run step in which, when said second certificate of authenticity data matches said verification of authenticity data in said data comparison step, said electronic device runs said downloaded second software.

2. The method for downloading software as set forth in claim 1;

wherein, when the download of said second software is interrupted in said downloading step, said storing step in said second data storage area is skipped and the process is re-executed from said downloading step.

3. The method for downloading software as set forth in claim 1, further comprising:

a step in which, after said data storing step in said first data storage area is performed, said second certificate of authenticity data stored in said second data storage area is deleted.

4. The method for downloading software as set forth in claim 1, further comprising:

a step in which, when said second certificate of authenticity data does not match said verification of authenticity data in said data comparison step, said downloaded second software is deleted.

* * * * *